United States Patent
Van Niekerk et al.

(10) Patent No.: US 9,687,928 B2
(45) Date of Patent: Jun. 27, 2017

(54) FIXING ELEMENT, METHOD FOR WELDING A FIXING ELEMENT TO A COMPONENT AND COMPONENT CONNECTION

(71) Applicant: Bayerische Motoren Werke Aktiengesellschaft, Munich (DE)

(72) Inventors: Johann Van Niekerk, Munich (DE); Hannes Vasold, Schweitenkirchen (DE); Stefan Aigner, Pfakofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 139 days.

(21) Appl. No.: 14/305,670

(22) Filed: Jun. 16, 2014

(65) Prior Publication Data

US 2014/0294488 A1 Oct. 2, 2014

Related U.S. Application Data

(63) Continuation of application No. PCT/EP2013/051406, filed on Jan. 25, 2013.

(30) Foreign Application Priority Data

Mar. 1, 2012 (DE) ........................ 10 2012 203 217

(51) Int. Cl.
    *B25G 3/34* (2006.01)
    *F16B 11/00* (2006.01)
    (Continued)

(52) U.S. Cl.
    CPC ................ *B23K 9/00* (2013.01); *B23K 9/201* (2013.01); *B23K 35/02* (2013.01); *F16B 5/08* (2013.01);
    (Continued)

(58) Field of Classification Search
    CPC ...... Y10T 403/471; B23K 35/02; B23K 9/00; B23K 9/201; B23K 2201/006;
    (Continued)

(56) References Cited

U.S. PATENT DOCUMENTS 4,319,116 A * 3/1982 Kauppi et al. .................. 219/72
4,359,264 A * 11/1982 Zeigler et al. ................ 359/606
(Continued)

FOREIGN PATENT DOCUMENTS

CN 202001445 U 10/2011
DE 1 625 492 A1 7/1970
(Continued)

OTHER PUBLICATIONS

German Office Action dated Nov. 27, 2012 (six (6) pages).
(Continued)

*Primary Examiner* — Gregory Binda
*Assistant Examiner* — Nahid Amiri
(74) *Attorney, Agent, or Firm* — Crowell & Moring LLP

(57) ABSTRACT

A fixing element has a base area that is provided for the purpose of being welded to a component, and a functional head protruding from a base area that is formed by at least one spherical, or sphere-like element. The fixing element may be welded to a first component and function as a male fixing element that cooperates with a female fixing element of a second component such that the first and second components are detachably connectable via the fixing elements.

16 Claims, 1 Drawing Sheet

(51) Int. Cl.

| | | |
|---|---|---|
| *F16B 12/04* | (2006.01) | |
| *F16L 13/00* | (2006.01) | |
| *B23K 9/00* | (2006.01) | |
| *F16B 5/08* | (2006.01) | |
| *B23K 35/02* | (2006.01) | |
| *B23K 9/20* | (2006.01) | |
| *F16B 5/06* | (2006.01) | |
| *B23K 101/00* | (2006.01) | |
| *B23K 103/04* | (2006.01) | |
| *B23K 103/10* | (2006.01) | |

(52) U.S. Cl.
CPC .... *B23K 2201/006* (2013.01); *B23K 2203/04* (2013.01); *B23K 2203/10* (2013.01); *F16B 5/0642* (2013.01); *Y10T 403/471* (2015.01)

(58) Field of Classification Search
CPC ............ B23K 2203/04; B23K 2203/10; F16B 5/0642; F16B 5/08
USPC ............. 403/266, 268, 270, 271; 219/137 R; 296/29
See application file for complete search history.

(56) References Cited

U.S. PATENT DOCUMENTS

| | | | |
|---|---|---|---|
| 8,070,820 B2* | 12/2011 | Winslow et al. | 623/19.13 |
| 8,211,182 B2* | 7/2012 | Linares | A61B 17/1617 623/22.15 |
| 8,303,665 B2* | 11/2012 | Tornier et al. | 623/19.11 |
| 2009/0070983 A1 | 3/2009 | Stumpf et al. | |
| 2011/0173797 A1 | 7/2011 | van Niekerk et al. | |
| 2012/0014008 A1* | 1/2012 | Snegg | 359/872 |
| 2013/0036594 A1 | 2/2013 | Hammer et al. | |
| 2013/0043228 A1 | 2/2013 | Hammer et al. | |
| 2013/0185916 A1 | 7/2013 | Mantei et al. | |

FOREIGN PATENT DOCUMENTS

| | | |
|---|---|---|
| DE | 10 2007 044 635 A1 | 4/2009 |
| DE | 10 2008 034 846 A1 | 12/2009 |
| DE | 10 2008 038 747 A1 | 2/2010 |
| DE | 10 2010 015 179 A1 | 12/2010 |
| DE | 10 2009 049 602 B3 | 7/2011 |
| DE | 10 2010 028 322 A1 | 11/2011 |
| DE | 10 2010 028 323 A1 | 11/2011 |
| DE | 10 2010 040 547 A1 | 3/2012 |
| WO | WO 2011/134563 A1 | 11/2011 |
| WO | WO 2011/134564 A1 | 11/2011 |

OTHER PUBLICATIONS

International Search Report dated May 7, 2013 with English translation (five (5) pages).
Chinese Office Action issued in counterpart Chinese Application No. 201380004039.4 dated Aug. 21, 2015, with English translation (Fifteen (15) pages).
Chinese Office Action issued in counterpart Chinese Application No. 201380004039.4 dated May 5, 2016, with English translation (fourteen (14) pages).

* cited by examiner

FIXING ELEMENT, METHOD FOR WELDING A FIXING ELEMENT TO A COMPONENT AND COMPONENT CONNECTION

CROSS REFERENCE TO RELATED APPLICATIONS

This application is a continuation of PCT International Application No. PCT/EP2013/051406, filed Jan. 25, 2013, which claims priority under 35 U.S.C. §119 from German Patent Application No. 10 2012 203 217.7, filed Mar. 1, 2012, the entire disclosures of which are herein expressly incorporated by reference.

BACKGROUND AND SUMMARY OF THE INVENTION

The present invention relates to a fixing element, a method for welding a fixing element to a component, and a component connection with the fixing element and the component.

A component connection with a first component, particularly a first automobile component, that has a male fixing element protruding from the first component, and a second component, particularly a second automobile component, that has a female fixing element provided for receiving the male fixing element or that cooperates with a female fixing element provided for receiving the male fixing element, wherein the male fixing element being introduced in a lead-in device into the female fixing element, is known from the older, unpublished document DE 10 2010 040 547.7. The relevant prior art further includes DE 10 2010 028 323 A1, DE 10 2009 049 602.5, DE 10 2008 038 747 A1, DE 10 2009 041 161 A1, DE 10 2010 028 322 A1 and DE 10 2007 044 635 A1.

In large-scale series production of automobile bodies, a large number of individual body parts and mounted parts, such as brackets, etc., are assembled for the most part by automated means. During a joining process, two or more body parts are first positioned relative to each other by use of elaborate clamping and mounting technology and then connected together, for example, through welding, clinching or other joining methods.

The object of the invention is to provide a fixing element, a method for welding a fixing element to a component, and a component connection with such a fixing element that is versatile for the connecting of components, particularly body parts of automobiles.

A fixing element according to the invention has a base area and a functional head protruding from the base area that is formed by at least one spherical or sphere-like element. The terms "spherical" and "sphere-like" must be interpreted very broadly in the sense that at least one element can, in whole or in part, have the shape of a sphere, a spheroid, or a spherical calotte, or have a spheroid-like shape. The term "sphere-like" is not limited here to the mathematical concept of spherical geometry. "Sphere-like" can have the very general meaning "convexly arched," for example. Preferably, the at least one spherical or sphere-like element of the functional head is rotationally symmetrical with respect to a normal direction of the base area. The terms "spherical" and "sphere-like" very generally include "round" and "arched," particularly "convexly arched geometries."

The base area of such a fixing element is provided for the purpose of being welded to a component, or being welded onto a component, so that the fixing element protrudes from the component as a "male fixing element."

The fixing element can be manufactured in a single piece, i.e., the base area and the functional head can be manufactured in one and the same production process, for example through cold extrusion, electromagnetic shaping, etc. Alternatively, the base area and the functional head can also be manufactured in separate processes and then connected together into a fixing element, for example through capacitor discharge welding, arc ignition welding, resistance welding, etc.

To weld such a fixing element to a component, the fixing element is first placed onto the component with the (bottom) side of the base area facing away from the functional head. The base area is then welded to the component. Especially worthy of consideration as the welding method is an arc ignition welding process. Other welding methods are also contemplated, however, such as projection welding.

Such a fixing element can be used to connect a first component to a second component. Such a "component connection" has a first component from which a fixing element protrudes, as described above. The base area of the fixing element is welded here to the first component.

The second component to be connected to the first component has a female fixing element provided for receiving the fixing element or the functional head of the fixing element, or a provision can be made that the second component cooperates with a female fixing element provided for receiving the male fixing element, which can be embodied as a clip element or the like, for example.

To connect the two components, the male fixing element is inserted in a lead-in device into the female fixing element. The at least one spherical or sphere-like element of the functional head of the fixing element is substantially oversized with respect to the female fixing element transversely to the lead-in device, so that the two components are clamped together on the fixing elements or to each other by way of the fixing elements.

The base area can have the shape of a pedestal, a plate or a plate-like element. Since the base area of the fixing element is welded to the first component, it is advantageous if a (bottom) side of the base area facing away from the functional head tapers inwardly in the direction away from the functional head. The (bottom) side of the base area can, for example, be conically tapering, which is particularly advantageous for welding in arc ignition welding processes. For other welding methods, such as resistance welding, other geometries can be more advantageous.

According to a development of the invention, the first and/or the second component is a sheet metal component, particularly a steel, stainless steel or aluminum sheet metal component. Preferably, the fixing element is also composed completely of metal, particularly of steel or aluminum.

The method is particularly suited to vehicle body engineering, so that the first and/or the second component can be body components. However, the method can also be used in a large number of applications outside of the automotive industry, for example in the area of "white goods," the furniture industry, architecture, construction, etc.

The component connection described above can be used very advantageously for the "pre-fixing" of two (body) components to be connected permanently to each other. The two components can very easily be "provisionally," or "detachably" put together or clamped together and then permanently and firmly connected to each other by way of another connection, such as a weld connection, through screwing, riveting, etc.

Other objects, advantages and novel features of the present invention will become apparent from the following detailed description of one or more preferred embodiments when considered in conjunction with the accompanying drawing.

DETAILED DESCRIPTION OF THE DRAWING

Figure 1:
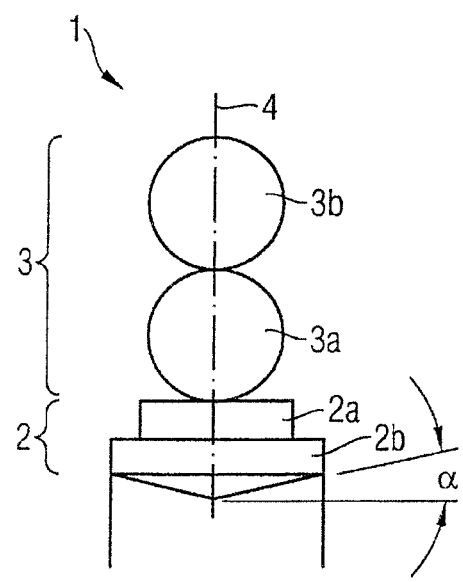
FIG. 1 is a schematic view of a fixing element according to an embodiment of the invention.

FIG. 1 shows a fixing element 1 having a base area 2 and a functional head 3. The base area 2 and the functional head 3 can be manufactured from one and the same material. The base area and the head area 3 can, particularly, be manufactured in a single piece. Alternatively, the functional head 3 can also be welded onto the base area 2.

As can be seen in FIG. 1, the functional head 3 has two spherical sections 3a, 3b that are provided for the purpose of being introduced in a clamping manner into a female fixing element (e.g., into a through hole or the like). Alternatively, an element (such as a holding clip) that can be clipped onto the two sections 3a, 3b or onto one of the two sections 3a or 3b can be formed as a female fixing element.

In the exemplary embodiment shown in FIG. 1, midpoints of the spherical sections 3a, 3b lie on a center or symmetry axis of the base area 2. The base area 2 is formed here as a pedestal-shaped element with an upper section 2a, which is connected to the spherical section 3a, and a lower section 2b. As can be seen in FIG. 1, the bottom side of the lower section 2b tapers conically, with the cone angle being indicated in FIG. 1 with the symbol α.

Figure 2:
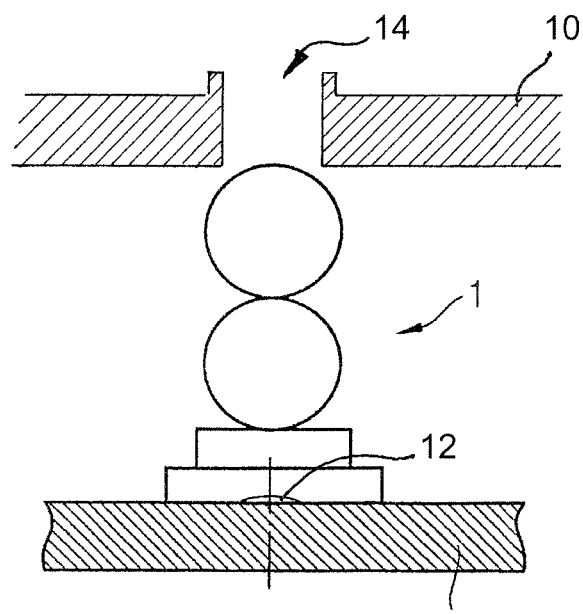
FIG. 2 is a schematic view of the fixing element shown in FIG. 1 welded onto a sheet metal component, as well as showing a second component 10 having a female fixing element 14.

The fixing element shown in FIG. 1 can be welded 12, for example, using an arc ignition welding process, onto a sheet metal component 5, which is shown in FIG. 2. If, as shown in FIG. 1, the bottom side of the base area is tapered, especially high-quality weld connections can be achieved. The second component 10 has a female fixing element 14, and can be connected to the first component 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of securing a fixing element to a vehicle body component, the method comprising the acts of:
   providing a fixing element comprising a base area configured to be welded to the vehicle body component and a functional head protruding from one side of the base area, the functional head comprising at least one spherical element;
   placing the base area of the fixing element onto the vehicle body component, wherein a side of the base area facing away from the functional head is placed on a surface of the vehicle body component; and
   arc ignition welding of the base area to the vehicle body component, wherein
   the base area comprises one or more plate-shaped elements,
   a side of the base area facing the functional head is flat, and
   the side of the base area facing away from the functional head tapers inwardly in a direction away from the functional head and toward the surface of the vehicle body component.

2. The method according to claim 1, wherein the inward tapering of the side of the base area facing away from the functional head is a conical tapering.

3. The method according to claim 2, wherein the fixing element consists only of metal.

4. The method according to claim 3, wherein the metal is steel or aluminum.

5. The method according to claim 1, wherein the functional head comprises two spherical elements connected to one another and extending perpendicular to the side of the base area facing the functional head.

6. A component connection, comprising:
   a first automotive component having a male fixing element protruding from one side of the first automotive component;
   a second automotive component having a female fixing element configured to receive the male fixing element;
   wherein the male fixing element comprises a base area and a functional head that protrudes from the base area, the base area comprising one or more plate-shaped elements, wherein a side of the base area facing the functional head is flat and the side of the base area facing away from the functional head tapers inwardly in a direction away from the functional head and toward a surface of the first automotive component,
   wherein a weld is formed between the base area and the first component, and the functional head is configured as at least one spherical element having a substantially oversized dimension with respect to the female fixing element, and
   wherein the male fixing element is introduced in a lead-in device into the female fixing element, the substantially oversized dimension of the at least one spherical or sphere-like element with respect to the female fixing element being transverse to the lead-in device such that the first and second automotive components are clamped together by the male and female fixing elements.

7. The component connection according to claim 6, wherein the female fixing element is a separate component that cooperates with the second automotive component.

8. The component connection according to claim 6, wherein the inward tapering of the side of the base area facing away from the functional head is a conical tapering.

9. The component connection according to claim 6, wherein the first and/or second automotive component is a sheet metal component.

10. The component connection according to claim 9, wherein the first and/or second automotive component is a vehicle body component.

11. The component connection according to claim 6, wherein the male fixing element consists only of metal.

12. The component connection according to claim 11, wherein the metal is steel or aluminum.

13. The component connection according to claim 6, further comprising a weld connection of the first and second automotive components in addition to the clamped connection of the two components via the male fixing element and the female fixing element.

14. The component connection according to claim 6, wherein the functional head comprises two spherical elements connected to one another and extending perpendicular to the side of the base area facing the functional head.

15. A fixing element for vehicle body construction, consisting essentially of:
- a base area configured for being welded to a vehicle body component; and
- a functional head protruding from one side of the base area, the functional head comprising one or two spherical elements, wherein
- the base area comprises one or more plate-shaped elements,
- a side of the base area facing the functional head is flat, and
- the side of the base area facing away from the functional head tapers inwardly in a direction away from the functional head.

16. The fixing element according to claim 15, wherein the inward tapering of the side of the base area facing away from the functional head is a conical tapering.

\* \* \* \* \*